US012611793B2

(12) United States Patent
Asada et al.

(10) Patent No.: US 12,611,793 B2
(45) Date of Patent: Apr. 28, 2026

(54) METHOD FOR MANUFACTURING FIBER BOARD AND BIOMASS COMPRESSED MATERIAL FOR MANUFACTURING FIBER BOARD

(71) Applicant: Panasonic Housing Solutions Co., Ltd., Osaka (JP)

(72) Inventors: Teppei Asada, Kyoto (JP); Tatsuji Ono, Osaka (JP); Naohiko Maeda, Osaka (JP); Hiroki Nishi, Osaka (JP); Mohd Erman, Osaka (JP); Hiroki Shiota, Osaka (JP); Shinji Adachi, Osaka (JP)

(73) Assignee: Panasonic Housing Solutions Co., Ltd., Osaka (JP)

( * ) Notice: Subject to any disclaimer, the term of this patent is extended or adjusted under 35 U.S.C. 154(b) by 272 days.

(21) Appl. No.: 18/030,992

(22) PCT Filed: Oct. 12, 2021

(86) PCT No.: PCT/JP2021/037702
§ 371 (c)(1),
(2) Date: Apr. 8, 2023

(87) PCT Pub. No.: WO2022/080358
PCT Pub. Date: Apr. 21, 2022

(65) Prior Publication Data

US 2023/0278254 A1 Sep. 7, 2023

(30) Foreign Application Priority Data

Oct. 14, 2020 (JP) ................................ 2020-173526

(51) Int. Cl.
*B27N 3/04* (2006.01)
*B27N 3/06* (2006.01)

(52) U.S. Cl.
CPC ................ *B27N 3/04* (2013.01); *B27N 3/06* (2013.01)

(58) Field of Classification Search
CPC ........................................................ B27N 3/04
See application file for complete search history.

(56) References Cited

U.S. PATENT DOCUMENTS

| | | | | |
|---|---|---|---|---|
| 2002/0036365 A1* | 3/2002 | Uhland | B27N 1/00 264/122 |
| 2008/0221318 A1 | 9/2008 | Edelmann et al. | |
| 2020/0122353 A1 | 4/2020 | Maeda et al. | |
| 2020/0172733 A1* | 6/2020 | Naito | C08K 3/30 |

FOREIGN PATENT DOCUMENTS

| | | | | | |
|---|---|---|---|---|---|
| CN | 1266768 | A | | 9/2000 | |
| CN | 101484517 | A | | 7/2009 | |
| CN | 110914030 | A | | 3/2020 | |
| DE | 19616892 | A1 | * | 11/1996 | B27N 1/00 |
| JP | 2002-052514 | A | | 2/2002 | |
| JP | 2011-020430 | A | | 2/2011 | |
| JP | 2015-160366 | A | | 9/2015 | |
| JP | 2017057631 | A | * | 3/2017 | |
| JP | 2018-069670 | A | | 5/2018 | |
| JP | 2019089936 | A | * | 6/2019 | B27N 3/002 |
| JP | 2020-089988 | A | | 6/2020 | |
| WO | 2007/023009 | A2 | | 3/2007 | |
| WO | WO-2015118814 | A1 | * | 8/2015 | B27N 3/16 |
| WO | 2018/216682 | A1 | | 11/2018 | |
| WO | 2020/116042 | A1 | | 6/2020 | |

OTHER PUBLICATIONS

"DE19616892_Machine Translation" is a machine translation of DE-19616892-A1. (Year: 1996).*
Extended European Search Report for corresponding Application No. EP21880097.7 issued Mar. 13, 2024.
International Search Report for corresponding Application No. PCT/JP2021/037702, mailed Jan. 11, 2022.
Written Opinion for corresponding Application No. PCT/JP2021/037702, mailed Jan. 11, 2022.
Chinese Office Action dated Nov. 29, 2024 corresponding to Chinese Patent Application No. 202180068928.1, with Machine Translation.
Chinese Office Action corresponding to counterpart Chinese patent application No. 202180068928.1 dated May 22, 2025, with English translation.

* cited by examiner

*Primary Examiner* — Virak Nguon
(74) *Attorney, Agent, or Firm* — Renner, Otto, Boisselle & Sklar, LLP

(57) ABSTRACT

An adhesive is added to woody fibers obtained by steaming and defibrating a woody material. Then, the woody fibers are formed and are subjected to thermocompression molding. The woody material includes a compressed material obtained by compressing and integrating together a plurality of dried ground products of a Palmae plant.

2 Claims, No Drawings

METHOD FOR MANUFACTURING FIBER BOARD AND BIOMASS COMPRESSED MATERIAL FOR MANUFACTURING FIBER BOARD

TECHNICAL FIELD

The present disclosure relates to methods for manufacturing fiber boards and biomass compressed materials for manufacturing the fiber boards. More specifically, the present disclosure relates to a method for manufacturing a fiber board including a woody material and a biomass compressed material for manufacturing the fiber board.

BACKGROUND ART

Patent Literature 1 describes a manufacturing method of a woody fiber plate. The manufacturing method includes drying woody fibers obtained by steaming and defibrating wood chips, adding an isocyanate-based adhesive to the woody fibers, and then forming and hot pressing the woody fibers. Here, before the steaming, or during the steaming, of the wood chips, starches are added to the wood chips. As the wood chips, south-sea wood chips are employed.

The south-sea wood, however, has been decreasing on a global basis in recent years, and therefore, Patent Literature 2 proposes a fiber plate including woody fibers obtainable from an oil palm instead of the south-sea wood.

CITATION LIST

Patent Literature

Patent Literature 1: JP 2002-052514 A
Patent Literature 2: JP 2018-069670 A

SUMMARY OF INVENTION

Application of the manufacturing method described in Patent Literature 1 to Palmae plants, however, may results in reduced productivity because the Palmae plants are materials having a poor storage property and a low bulk density after drying.

It is an object of the present disclosure to provide a method for manufacturing a fiber board with excellent productivity and a biomass compressed material for manufacturing the fiber board also when Palmae plants which are materials having a poor storage property and a low bulk density after drying are employed.

A method for manufacturing a fiber board according to an aspect of the present disclosure includes adding an adhesive to woody fibers obtained by steaming and defibrating a woody material and then forming the woody fibers and performing thermocompression molding on the woody fibers. The woody material includes a compressed material obtained by compressing and integrating together a plurality of dried ground products of a Palmae plant.

A biomass compressed material for manufacturing a fiber board according to an aspect of the present disclosure is a compressed material obtained by integrating together a plurality of dried ground products of a Palmae plant.

DESCRIPTION OF EMBODIMENTS

Embodiment

(1) Overview

It will be described below how the inventors of the present disclosure arrived at a method for manufacturing a fiber board and a biomass compressed material for manufacturing the fiber board according to the present embodiment.

A current market for woody board is a global market worth more than 10 trillion yen annually, and market expansion and increasing demand are predicted concurrently with the rise of global environmental problems. Accompanying to this prediction, there is increased need for a utilization technology for alternatively usable materials because south-sea wood represented by lauan and the like and conifers represented by cedar and the like which are conventionally used are exhaustible resources that need 30 years or longer to grow.

Types of the woody board are roughly classified into, for example, laminated lumber mainly for use in a structure member application and/or a framework application, a chip board for use in a foundation application and/or as a furniture material, and a fiber board widely used as an interior decoration member and/or as surface dressed lumber of furniture. A utilization technology for low-quality wood such as small-diameter wood and fast-growing plantation wood as materials alternative to the exhaustible resources for these woody boards has been developed and is currently in practical use all over the world, but along with a further increased usage amount, a worldwide decrease in plantation area, and the like, procuration of these materials may gradually become difficult.

Among these woody boards, the fiber board is manufacturable as long as at least a fiber-like material, but not wood pieces having certain shapes, is available, and therefore, many efforts have been and are being made on utilization technologies, as further material technologies in the future, for plants, such as bamboos, straws, and bagasse including strong bast fibers, belonging to the Poaceae family and/or plants, such as kenaf and jute, belonging to the Malvaceae family. However, those material technologies are not widely put to practical use due to problems in terms of quality, manufacturing, procurement of raw materials, and the like.

In such a situation, attention is attracted to Palmae plants such as oil palms and coconut palms widely distributed especially in tropical regions as a material largely accumulated as a raw material. In particular, in the case of the oil palms, as the palm oil industry grows, an increased amount of Oil Palm Trunks (OPT), Empty Fiber Bulks (EFB), and the like is discarded, and for example, in Malaysia, which is one of the palm oil-producing countries, no less than 50 million tons of the OPT, the EFB, and the like results in waste products. Abandoning the waste products releases no less than 1 million tons of methane gas annually. When converted into the amount of carbon dioxide emissions, the methane gas amounts to about 10 percent of the amount of national carbon dioxide emissions and are thus currently serious social problems.

The annual usage amount of fiber boards in the world is 150 million tons, and therefore, the 50 million tons of the OPT, the FEB, and the like which are discarded already correspond to an extremely large accumulation amount which is worth about ⅓ of the fiber boards used in the world. However, the Palmae plants have a water content of about 70 to 300%, which is two or more times the water content of general south-sea wood, and therefore, the Palmae plants have the problem that green lumber thereof decays in 1 to 2 weeks, that is, the Palmae plants have a very poor storage property.

Moreover, the apparent specific gravity of usual Palmae plants in a green lumber state is about 0.60 to 0.80, but the specific gravity after drying is about 0.35. Thus, when the Palmae plants are transported in the green lumber state, a material portion obtained is about ½ of the mass of the Palmae plants actually transported. Moreover, when the Palmae plants are dried on site, the bulk density is too low at the time of transportation, and therefore, the number of times of transportation increases, which lowers a transportation efficiency.

Moreover, in the case of the Palmae plants, a fiber portion is a rigid fiber but includes about 40 mass % fine particles which are parenchymatous cells having a diameter of smaller than 0.5 mm. Generally, when Palmae plants are employed as a raw material to manufacture a fiber board by a conventional method, these fine particles not only cause a board productivity reduction such as blade jams, drying defects, and quality variations at the time of manufacturing but also have the problem that the strength performance of the fiber board cannot be satisfactorily secured because these fine particles do not contribute to expression of strength.

Due to the problems, the Palmae plants have not been put in a practical use in the fiber board application, and most of waste products of oil palms are currently abandoned on site and are still causing the social problems.

Therefore, the present embodiment enables fiber boards to be manufactured with high productivity also when Palmae plants which are waste materials having a poor storage property and a low bulk density after drying are employed as a raw material, and at the same time, the present embodiment can aim to: provide fiber boards which can stabilize procurement by alternative use of fiber boards in a future global market; and solve the social problems in Southeast Asia.

That is, the method for manufacturing the fiber board according to the present embodiment includes adding an adhesive to woody fibers obtained by steaming and defibrating a woody material and then forming the woody fibers and performing thermocompression molding on the woody fibers. Here, the woody material includes a compressed material obtained by compressing and integrating together a plurality of dried ground products of a Palmae plant.

As explained above, the method for manufacturing the fiber board according to the present embodiment employs the biomass compressed material obtained by compressing and integrating together the plurality of dried ground products of the Palmae plant. Since the biomass compressed material which includes fiber tissue less susceptible to damage and which is less likely to decay as described above is employed to manufacture the fiber board, the fiber board having excellent strength and practical usefulness is easily obtainable with high productivity also when the Palmae plants which are waste materials having a poor storage property and a low bulk density after drying are employed as a raw material.

(2) Details

<Biomass Compressed Material for Manufacturing Fiber Board>

The biomass compressed material for manufacturing the fiber board according to the present embodiment is a compressed material of the plurality of dried ground products of the Palmae plant. That is, palm cut pieces and/or crush pieces which are ground products of a Palmae plant are employed as a raw material, are dried, and are compressed together, thereby obtaining a biomass compressed material including nondepletable living resources (Palmae plants). The biomass compressed material for manufacturing the fiber board (hereinafter also referred to simply as a "biomass compressed material") is improved in transportability and is improved in productivity as compared with the case where the ground product of the Palmae plant are not compression. Moreover, since the dried ground products are employed, decay can be prevented from progressing, the yield of materials can be increased, and the productivity is improved.

Although the type of Palmae plants causing the social problems is oil palm, the types of the Palmae plant used for the biomass compressed material may be doub palm, coconut palm, date palm, sago palm, açaí palm, chusan palm, and the like and are not particularly limited. Moreover, usable portions are, for example, but not limited to, trunk portions, leaf portions, fruit portions, bunch portions, and seed portions.

The Palmae plant is ground and dried and is then subjected to a compression process. Note that grinding and drying can be done in whichever order comes first, or grinding and drying may be concurrently performed. Moreover, a method for grinding the Palmae plant is not particularly limited but may be performed by using, for example, a chipper. Moreover, the ground product is preferably dried such that the water content is lower than or equal to 25 mass % so that the decay is prevented from progressing. Note that subjecting the Palmae plant thus ground to water washing is preferable to reduce an ash content, thereby reducing process troubles caused due to the ash component in a steaming step and the like which will be described later.

The ground products of the Palmae plant are an aggregate of fiber-like articles (including powder-like articles) obtainable by grinding the usable portions of the Palmae plant. The ground products of the Palmae plant preferably includes Palmae plant vascular tissue. The Palmae plant vascular tissue is tissue which transports moisture and nutrients required for the Palmae plant to grow and which includes xylem and phloem. The xylem is a conduction path of water and nutrients absorbed through roots and includes vessels and tracheids. The phloem is a conduction path of nutrients produced at leaves and includes sieve tubes.

The ground products of the Palmae plant preferably have a length within the range of from greater than or equal to 0.8 mm to less than or equal to 50.0 mm and a size within the range of from greater than or equal to 0.10 mm to less than or equal to 2.00 mm. When the length of the ground products is shorter than 0.8 mm or the size of the ground products is smaller than 0.10 mm, the Palmae plant vascular tissue included in the ground products according to the present embodiment is excessively fine, and therefore, the fiber board is more likely to have reduced strength. In contrast, when the length of the ground products is longer than 50.0 mm or the size of the ground products is larger than 2.00 mm, the fiber shape of woody fibers which are included in the fiber board according to the present embodiment and which will be described later is excessively coarse, and therefore, the fiber board is more likely to have reduced surface smoothness. Note that the "size" as used in the present disclosure means the diameter.

The ground products of the Palmae plant preferably have a length within the range of from greater than or equal to 5.0 mm to less than or equal to 40.0 mm, and more preferably have a size within the range of from greater than or equal to 0.3 mm to less than or equal to 2.00 mm.

Note that the length and the size of the ground products of the Palmae plant are obtainable by measuring the length and the size by photographing a predetermined amount of ground products or observing the predetermined amount of ground products by using a magnifying viewer.

The mass ratio of ground products having a length within the range of from greater than or equal to 0.8 mm to less than or equal to 50.0 mm and a size within the range of from greater than or equal to 0.10 mm to less than or equal to 2.00 mm is preferably greater than or equal to 70% with respect to the total amount of the ground products of the Palmae plant. When the mass ratio is less than 70%, a fiber component contributing to expression of the strength of the fiber board of the present embodiment decreases, and therefore, the fiber board is more likely to have reduced strength. In addition, due to an increased ratio of Palmae plant parenchymous tissue which is the main component of the fine particles to the ground products of the Palmae plant, blade jams, drying defects, quality variations, and the like are more likely to occur, which may make stable manufacturing of the fiber boards difficult. The mass ratio of the ground products of the Palmae plant which have a length within the range of from greater than or equal to 0.8 mm to less than or equal to 50.0 mm and a size within the range of from greater than or equal to 0.10 mm to less than or equal to 2.00 mm is preferably greater than or equal to 80%, and most preferably 100%, with respect to the total amount of the ground products of the Palmae plant.

The ground products of the Palmae plant are preferably ground products obtained by grinding the Palmae plant and then reducing the amount of the Palmae plant parenchymous tissue by classification. That is, the ground products of the Palmae plant include small ground products including the Palmae plant parenchymous tissue as a main component and large ground products including the Palmae plant vascular tissue as a main component, where the amount of the small ground product is preferably reduced. The Palmae plant parenchymous tissue is tissue including Palmae plant parenchymatous cells. The Palmae plant parenchymous tissue includes assimilation tissue, secretory tissue, storage tissue, and the like and has physiological activities which are synthesis, decomposition, storage, and the like.

When a lot of Palmae plant parenchymous tissue is included in the ground products of the Palmae plant, stable manufacturing of the fiber board may become difficult because the Palmae plant parenchymous tissue is a fine particle. Therefore, in the present embodiment, the amount of the Palmae plant parenchymous tissue is reduced to obtain the Palmae plant ground products having a low content of the Palmae plant parenchymous tissue. A method for reducing the amount of Palmae plant parenchymous tissue may employ a method of removing small ground products having a small size by classification. Examples of the classification include a sieving method, an air classification method, a bathing method, and the like, but the method for the classification is not particularly limited.

The biomass compressed material according to the present embodiment is obtainable by compressing and integrating together the plurality of dried ground products. That is, the biomass compressed material according to the present embodiment is a compressed material which includes a plurality of dried ground products of Palmae plants (biomass) and which is obtained by integrating these ground products together. The biomass compressed material may have, for example, a pill shape, a pellet shape, a tablet shape, a briquette shape, a block shape, or a plate shape, but the shape of the biomass compressed material is not limited to these examples. The ground products are subjected to a compression process and are integrated into one piece by using a compression molding machine such as a pelletizer, so that the biomass compressed material is molded into a prescribed shape. Note that when the ground products are compressed, no adhesive is used, but the ground products are integrated together by compression force. However, the adhesive may be used to such an extent that the adhesive does not hinder the defibration of the woody material. Moreover, a material having functionality, such as an antibacterial agent, an aromatic substance, and a colorant, may be added to the ground products, and the material and the ground products may then be integrated together. This is preferable because in this case, these functions can be imparted to the fiber board to be obtained.

The biomass compressed material preferably has a specific gravity within the range of from greater than or equal to 0.35 to less than or equal to 1.50. When the specific gravity of the biomass compressed material is less than 0.35, the biomass compressed material has reduced mechanical durability and is more likely to be crushed or broken during transportation. When the specific gravity of the biomass compressed material is greater than 1.50, the fiber tissue included in the ground products of the Palmae plant may be damaged by compression, thereby deteriorating the strength performance of an eventually obtainable fiber board. The specific gravity of the biomass compressed material is more preferably within the range of from greater than or equal to 0.40 to less than or equal to 1.50, and when the specific gravity is less than 0.40, the bulk density is high, and the volume thus causes a reduction in transportation efficiency, thereby increasing the number of round trips for transportation. The specific gravity of the biomass compressed material is thus preferably within the range of from greater than or equal to 0.40 to less than or equal to 1.50.

The biomass compressed material preferably has a water content of 25 mass % or lower, more preferably 20 mass % or lower. When the water content is higher than 25 mass %, the biomass compressed material is more likely to have reduced shape maintainability and is at the same time more likely to decay, and therefore, the storage property is also more likely to be deteriorated.

As explained above, when the specific gravity is within the range of from greater than or equal to 0.35 to less than or equal to 1.50, the biomass compressed material of the present embodiment has an improved storage property and improved mechanical durability, and the fiber tissue of the Palmae plant is thus less susceptible to damage by compression. Moreover, when the water content is 25 mass % or lower, the biomass compressed material of the present embodiment is less likely to decay and thus has an improved storage property. Note that the "mechanical durability" as used in the present disclosure means the shape retainability and refers to a characteristic of being less likely to crush or break during the storage.

<Method for Manufacturing Fiber Board>

The method for manufacturing the fiber board according to the present embodiment includes adding the adhesive to the woody fibers obtained by steaming and defibrating the woody material and then forming the woody fibers and performing thermocompression molding on the woody fibers. As the woody material, the biomass compressed material according to the present embodiment is employed. The method for manufacturing the fiber board according to the present embodiment employs the biomass compressed material described above and thus enables boards with a stable quality to be easily manufactured also when Palmae plants having a low bulk density are employed. Note that as the woody material, only the biomass compressed material may be used, or ground products of south-sea wood and/or conifer conventionally used for manufacturing a fiber plate of intermediate density and the biomass compressed material may be used in combination.

In the steaming, the woody material (biomass compressed material) is processed with a high-temperature and high-pressure saturated water vapor. Conditions for the steaming are not particularly limited, but the steaming may be performed, for example, at a temperature of 150 to 200° C. and at a pressure of 0.5 to 2.0 MPa for 1 to 15 minutes. The steaming is performed by using a digester, for example.

The defibration is a process of dissociating the woody material (biomass compressed material) into woody fibers (mainly, the Palmae plant vascular tissue). In the defibration, the woody material after steaming is processed by, for example, a refiner.

After the defibration, the woody fibers are dried as necessary. The drying is a process of reducing the water content of the woody fibers thus defibrated. The drying may be performed by feeding hot air to the woody fibers thus defibrated. The water content of the woody fibers thus dried is not particularly limited but is preferably, for example, 20 mass % or lower with respect to the total amount of the woody fibers thus dried. Note that the drying may be performed after the adhesive is added to the woody fibers, may be performed before the adhesive is added to the woody fibers, may be performed while the adhesive is added to the woody fibers, or the adhesive is added to the woody fibers, and then, the woody fibers are dried, and the adhesive may be added again to the woody fibers.

The adhesive to be added to the woody fibers is used as a binder that cures and bonds the woody fibers together. As the adhesive, for example, a synthetic resin-based adhesive which is in liquid form at an ordinary temperature and is cured by heating is used, and, for example, an adhesive including diphenyl methane diisocyanate or an adhesive including urea melamine may be used.

The woody fibers to which the adhesive has been added are formed into a desired shape. For example, the woody fibers to which the adhesive has been added are formed into a mattress shape.

The woody fibers to which the adhesive has been added are formed and are then subjected to the thermocompression molding. That is, the woody fibers formed into a plate shape or the like are subjected to the thermocompression molding. The thermocompression molding may be carried out, for example, by sandwiching the woody fibers in the plate shape between a pair of hot plates and pressing the woody fibers in the plate shape. Molding conditions for the thermocompression molding are not particularly limited, but a molding temperature is, for example, within the range of from higher than or equal to 140° C. to lower than or equal to 230° C. A molding time period is, for example, within the range of from longer than or equal to 10 seconds to shorter than or equal to 3 minutes. A molding pressure is, for example, within the range of from greater than or equal to 0.5 MPa to less than or equal to 4 MPa. As a result of the thermocompression molding as described above, the adhesive added to the woody fibers is cured, and the woody fibers are thus bonded together, thereby manufacturing the fiber board of the present embodiment. The fiber board is widely usable for, for example, an architectural material, furniture, and dwelling house interior decoration.

Note that process facilities for the steaming, the defibrating, the adding of an adhesive, the forming, the thermocompression molding, and the like may use facilities similar to the facilities used for manufacturing conventional intermediate density fiber plates. Therefore, the use efficiency of the facilities can be increased, and thus, a fiber board can be obtained with excellent productivity also when Palmae plants which are waste materials having a poor storage property and a low bulk density after drying are employed as a raw material. Examples

Example 1

As shown in Table 1, oil palm trunks (OPT) as a raw material for a fiber board were taken out of oil palms and were put in a chipper, thereby obtaining ground products of a Palmae plant each having a 30 mm to 40 mm cuboidal shape. Thereafter, a foreign substance was removed by using a foreign substance remover, the ground products of the Palmae plant were put in a wet milling machine and were milled to obtain resultant products, which were then dried by using a rotary kiln until the water content of the resultant products became a predetermined water content. Thereafter, the resultant products were classified through an 8.6-mesh sieve and then through a 200-mesh sieve to reduce the ratio of Palmae plant parenchymous tissue, thereby obtaining ground products of the Palmae plant which have a mean length of 21.4 mm and a mean size of 1.08 mm. The ground products included 83 mass % ground products having a length of greater than or equal to 0.8 mm and less than or equal to 50.0 mm and a size of greater than or equal to 0.10 mm and less than or equal to 2.00 mm (hereinafter the ground products within this range are referred to as "large-size ground products"). Note that the mean length and the mean size of the ground products of the Palmae plant are obtained by measuring lengths and sizes of the ground products by using a magnifying viewer and obtaining respective arithmetic means. Moreover, the mass ratio of the large-size ground products is obtained by: measuring lengths and sizes of a predetermined amount of the ground products by using a magnifying viewer; classifying the ground products on the basis of whether or not the length is greater than or equal to 0.8 mm and less than or equal to 50.0 mm and the size is greater than or equal to 0.10 mm and less than or equal to 2.00 mm; and obtaining the mass ratio between the ground products included in this range and the ground products not included in this range.

The ground products of the Palmae plant thus obtained were used as a raw material and were subjected to a compression process by using a pelletizer to have a cylindrical pellet shape having a diameter of 15 mm and a length of 40 mm, thereby obtaining biomass compressed material having a specific gravity of 0.61 and a water content of 9 mass %.

These biomass compressed materials were put in a pressurization refiner, were steamed at 170° C. for 5 minutes, were then subjected to a defibration process, and were dried at 200° C. by using a jet dryer, thereby producing dried fibers (woody fibers).

To the dried fibers, 5 mass % diphenyl methane diisocyanate (MDI) as a binder were dispersed and applied, and then, the dried fibers were molded at 180° C. for 90 seconds, thereby obtaining a fiber board having a thickness of 3 mm and a density of 800 kg/m$^3$.

Example 2

As a raw material for a fiber board, oil palm empty fiber bulks (EFB) were employed, and in a step similar to that in Example 1, ground products of a Palmae plant which have a mean length of 32.5 mm, a mean size of 0.30 mm, and a large-size ground product content percentage of 92 mass % were produced. Thereafter, a tablet molding machine at the time of compressing the ground product of the Palmae plant was used to produce tablets having a diameter of 10 mm and a thickness of 5 mm, thereby obtaining biomass compressed materials having a specific gravity of 1.00 and a water content of 12 mass %. The fiber board was obtained in the same manner as Example 1 except that the biomass compressed materials thus produced were employed.

Example 3

As a raw material for a fiber board, trunk portions of coconut palms were employed, and in a step similar to that in Example 1, ground products of a Palmae plant which have a mean length of 7.8 mm, a mean size of 1.87 mm, and a large-size ground product content percentage of 75 mass % were produced. Thereafter, a briquetting machine was used at the time of compression of the ground products of the Palmae plant to produce cylindrical briquettes having a diameter of 80 mm and a length of 150 mm, thereby obtaining biomass compressed materials having a specific gravity of 1.35 and a water content of 19 mass %. The fiber board was obtained in the same manner as Example 1 except that the biomass compressed materials thus produced were employed.

Example 4

As a raw material for a fiber board, oil palm trunks (OPT) were employed, and in a step similar to that in Example 1, ground products of a Palmae plant which have a mean length of 40.6 mm, a mean size of 0.30 mm, and a large-size ground product content percentage of 92 mass % were produced. Thereafter, a 3-roll compacting machine was used at the time of compression of the ground products of the Palmae plant to produce compressed materials having a 100 mm block shape, thereby obtaining biomass compressed materials having a specific gravity of 0.40 and a water content of 9 mass %. The fiber board was obtained in the same manner as Example 1 except that the biomass compressed materials thus produced were employed.

Example 5

As a raw material for a fiber board, oil palm empty fiber bulks (EFB) were employed, and in a step similar to that of Example 1, ground products of a Palmae plant which have a mean length of 15.6 mm, a mean size of 0.79 mm, and a large-size ground product content percentage of 70 mass % were produced. Thereafter, a roller compacter was used at the time of compression of the ground products of the Palmae plant to produce plate-shaped compressed materials having a width of 120 mm, a length of 200 mm, and a thickness 5 mm, thereby obtaining biomass compressed materials having a specific gravity of 1.22 and a water content of 15 mass %. The fiber board was obtained in the same manner as Example 1 except that the biomass compressed materials thus produced were employed.

Example 6

A fiber board was obtained in the same manner as Example 1 except that when biomass compressed materials in pellet shape were produced, the specific gravity of the compressed materials was 0.30. Note that the large-size ground product content percentage of the biomass compressed materials was 83 mass %.

Example 7

A fiber board was obtained in the same manner as Example 1 except that when biomass compressed materials in pellet shape were produced, the specific gravity of compressed materials was 1.55.

Example 8

A fiber board was obtained in the same manner as Example 1 except that when biomass compressed materials in pellet shape were produced, the water content of compressed materials was 27 mass %.

Example 9

A fiber board was obtained in the same manner as Example 4 except that when biomass compressed materials in block shape were produced, ground products of a Palmae plant which have a mean length of 75.7 mm, a mean size of 0.30 mm, and a large-size ground product content percentage of 65 mass % were used to produce biomass compressed materials.

Example 10

A fiber board was obtained in the same manner as Example 2 except that when biomass compressed materials in tablet shape were produced, ground products of a Palmae plant which have a mean length of 32.5 mm, a mean size of 0.05 mm, and a large-size ground product content percentage of 63 mass % were used to produce biomass compressed materials.

Example 11

A fiber board was obtained in the same manner as Example 3 except that when biomass compressed materials in briquette shape were produced, ground products of a Palmae plant having a mean length of 10.3 mm, a mean size 1.92 mm, and a large-size ground product content percentage of 61 mass % were used to produce biomass compressed materials.

Example 12

A fiber board was obtained in the same manner as Example 1 except when biomass compressed materials in block shape were produced, ground products of a Palmae plant which have n mean length of 32.5 mm, a mean size of 2.50 mm, and a large-size ground product content percentage of 65 mass % were used to produce the biomass compressed materials.

Example 13

A fiber board was obtained in the same manner as Example 1 except that when biomass compressed materials in block shape were produced, ground products of a Palmae plant which have a mean length of 0.81 mm, a mean size of 0.15 mm, and a large-size ground product content percentage of 60 mass % were used to produce the biomass compressed materials.

<Evaluation Method>

Mechanical Durability Evaluation

For the biomass compressed materials thus molded, the mechanical durability DU of the biomass compressed materials was measured based on the woody pellet quality standard of Japan wood pellet association.

$$DU=(m0/m0)\times 100(\%)$$

m0: Pre-test mass
m1: Post-test mass

Determination

A: Greater than or equal to 97.5%
B: Greater than or equal to 96.5% and less than 97.5%
C: Less than 96.5%

Storage Property Evaluation

The fungus resistance of the biomass compressed materials was measured Based on "JIS Z 2911 Methods of Test for Fungus Resistance".

Determination

A: Longer than or equal to 14 days
B: Longer than or equal to 10 days and shorter than 14 days
C: Shorter than 10 days Strength Evaluation A flexural test of the fiber boards was performed based on "JIS A 5905 Fiberboards", and flexural strengths were measured.

Determination

A: Greater than or equal to 25 MPa
B: Less than 25 MPa and greater than or equal to 20 MPa
C: Less than 20 MPa Surface Smoothness Evaluation The centerline average roughness Ra of the fiber board was measured based on "JIS B 0601 Surface Roughness".

Determination

A: Less than or equal to 5 μm
B: Greater than or equal to 5 μm and less than or equal to 15 μm
C: Greater than 15 μm Results of the evaluation are shown in Table 2.

TABLE 1

| | Biomass Compressed Material | | | | | Ground Product | | |
|---|---|---|---|---|---|---|---|---|
| | Raw Material | Specific Gravity | Water Content | Shape | Size (mm) | Mean Length (mm) | Mean Size (mm) | Content Percentage (mass ratio) |
| Example 1 | Oil Palm Trunk (OPT) | 0.61 | 9% | Pellet Shape | φ15 × 40 | 21.4 | 1.08 | 83% |
| Example 2 | Oil Palm Empty Fiber Bulk (EFB) | 1.00 | 12% | Tablet Shape | φ10 × 5 | 32.5 | 0.30 | 92% |
| Example 3 | Coconut Palm Trunk | 1.35 | 19% | Briquette Shape | φ80 × 150 | 7.8 | 1.87 | 75% |
| Example 4 | Oil Palm Trunk (OPT) | 0.40 | 9% | Block Shape | 100 × 100 × 100 | 40.6 | 0.30 | 92% |
| Example 5 | Oil Palm Empty Fiber Bulk EFB) | 1.22 | 15% | Plate Shape | 5 × 120 × 200 | 15.6 | 0.79 | 70% |
| Example 6 | Oil Palm Trunk (OPT) | 0.30 | 9% | Pellet Shape | φ15 × 40 | 21.4 | 1.08 | 83% |
| Example 7 | Oil Palm Trunk (OPT) | 1.55 | 9% | Pellet Shape | φ15 × 40 | 21.4 | 1.08 | 83% |
| Example 8 | Oil Palm Trunk (OPT) | 0.61 | 27% | Pellet Shape | φ15 × 40 | 21.4 | 1.08 | 83% |
| Example 9 | Oil Palm Trunk (OPT) | 0.40 | 9% | Block Shape | 100 × 100 × 100 | 75.7 | 0.30 | 65% |
| Example 10 | Oil Palm Empty Fiber Bulk (EFB) | 1.00 | 12% | Tablet Shape | φ10 × 5 | 32.5 | 0.05 | 63% |
| Example 11 | Coconut Palm Trunk | 1.35 | 19% | Briquette Shape | φ80 × 150 | 10.3 | 1.92 | 61% |
| Example 12 | Oil Palm Trunk (OPT) | 0.61 | 9% | Pellet Shape | φ15 × 40 | 32.5 | 2.50 | 65% |
| Example 13 | Oil Palm Trunk (OPT) | 0.61 | 9% | Pellet Shape | φ15 × 40 | 0.81 | 0.15 | 60% |

TABLE 2

| | Biomass Compressed Material Quality | | Fiber Board Quality | |
|---|---|---|---|---|
| | Mechanical Durability | Storage Property | Strength | Surface Smoothness |
| Example 1 | A | A | A | A |
| Example 2 | A | A | A | A |
| Example 3 | A | A | A | A |
| Example 4 | A | A | A | A |
| Example 5 | A | A | A | A |
| Example 6 | B | A | A | A |
| Example 7 | A | A | B | A |
| Example 8 | A | B | A | A |
| Example 9 | A | A | A | B |
| Example 10 | A | A | B | A |
| Example 11 | A | A | B | A |
| Example 12 | A | A | A | B |
| Example 13 | A | A | B | A |

The evaluation of all Examples resulted in A or B, which confirms that all Examples have no problem in practical use as the fiber board and the method for manufacturing the fiber board.

In particular, comparing Example 1 and Example 6 with each other confirms that when the specific gravity of the biomass compressed material is small, the mechanical durability of the biomass compressed material is slightly low, and the biomass compressed material is more likely to break during transportation or in use.

Comparing Example 1 and Example 7 with each other confirms that when the specific gravity of the biomass compressed material is excessively large, the fiber board is more likely to have reduced strength.

Comparing Example 1 and Example 8 with each other confirms that when the water content of the biomass compressed material is excessively high, the biomass compressed material is more likely to have degraded storage property.

Comparing Example 4 and Example 9 with each other confirms that when the ground products has a large mean length and the large-size ground product content percentage is low, the fiber board is more likely to have reduced surface smoothness.

Comparing Example 2 and Example 10 with each other confirms that when the ground products has a small mean size and the large-size ground product content percentage is low, the fiber board is more likely to have reduced strength.

Comparing Example 3 and Example 11 with each other confirms that when the large-size ground product content percentage is low, the fiber board is more likely to have reduced strength.

According to Examples 9, 10, 12, and 13, the mean length and the mean size of the ground products and the large-size ground product content percentage are preferably within the respective predetermined ranges.

Summary

As described above, a method for manufacturing a fiber board of a first aspect includes adding an adhesive to woody fibers obtained by steaming and defibrating a woody material and then forming the woody fibers and performing thermocompression molding on the woody fibers. The woody material includes a compressed material obtained by compressing and integrating together a plurality of ground products of a Palmae plant. The plurality of ground products are dried.

This aspect enables a fiber board with a stable quality to be easily manufactured also when Palmae plants having a low bulk density are employed. This aspect also enables a storage property which is an issue of the Palmae plants to be improved and at the same time the transportability to be improved.

A second aspect is a method for manufacturing a fiber board of the first aspect, and in the method, the compressed material has a specific gravity of greater than or equal to 0.35 and less than or equal to 1.50 and a water content of lower than or equal to 25 mass %.

This aspect enables a fiber board with a stable quality to be easily manufactured also when Palmae plants having a low bulk density are employed. This aspect also enables a storage property which is an issue of the Palmae plants to be improved and at the same time the transportability to be improved.

A third aspect is a method for manufacturing a fiber board of the first or second aspect, and in the method, the plurality of ground products of the Palmae plant are ground products obtained by grinding the Palmae plant and then reducing an amount of Palmae plant parenchymous tissue in the Palmae plant by classification.

This aspect has the advantages that the Palmae plant parenchymous tissue which is a fine particle is less likely to be included in the woody material, so that a fiber board is easily stably manufactured.

A fourth aspect is a method for manufacturing a fiber board of any one of the first to third aspects, and in the method, the plurality of ground products of the Palmae plant include greater than or equal to 70 mass % ground products having a length of greater than or equal to 0.8 mm and less than or equal to 50.0 mm and a size of greater than or equal to 0.10 mm and less than or equal to 2.00 mm.

This aspect has the advantage that a fiber board with a further stabilized quality can easily be manufactured.

A biomass compressed material for manufacturing a fiber board of a fifth aspect is a compressed material obtained by integrating together a plurality of ground products of a Palmae plant. The plurality of ground products are dried.

This aspect employs the biomass compressed material in manufacturing a fiber board and thus enables a fiber board with a stable quality to be easily manufactured also when Palmae plants having a low bulk density are employed. Moreover, this aspect also enables a storage property which is an issue of the Palmae plants to be improved and at the same time the transportability to be improved.

A sixth aspect is a biomass compressed material for manufacturing a fiber board of the fifth aspect, and in the sixth aspect, the biomass compressed material has a specific gravity of greater than or equal to 0.35 and less than or equal to 1.50 and a water content of lower than or equal to 25 mass %.

This aspect employs the biomass compressed material in manufacturing a fiber board and thus enables a fiber board with a stable quality to be easily manufactured also when Palmae plants having a low bulk density are employed. This aspect also enables a storage property which is an issue of the Palmae plants to be improved and at the same time the transportability to be improved.

A seventh aspect is a biomass compressed material for manufacturing a fiber board of the fifth or sixth aspect, and in the seventh aspect, the plurality of ground products of the Palmae plant include greater than or equal to 70 mass % ground products having a length of greater than or equal to 0.8 mm and less than or equal to 50.0 mm and a size of greater than or equal to 0.10 mm and less than or equal to 2.00 mm.

This aspect has the advantage that a fiber board with a further stabilized quality can easily be manufactured.

The invention claimed is:

1. A method for manufacturing a fiber board, the method comprising:

adding an adhesive to woody fibers obtained by steaming and defibrating a woody material; and then forming the woody fibers and performing thermocompression molding on the woody fibers, the woody material including a compressed material obtained by compressing and integrating together a plurality of ground products of a Palmae plant, the plurality of ground products being dried, the compressed material having a specific gravity of greater than or equal to 0.35 and less than or equal to 1.50 and a water content of lower than or equal to 25 mass %, the plurality of ground products of the Palmae plant including greater than or equal to 70 mass % ground products having a length of greater than or equal to 0.8 mm and less than or equal to 50.0 mm and a size of greater than or equal to 0.10 mm and less than or equal to 2.00 mm.

2. The method of claim 1, wherein the plurality of ground products of the Palmae plant are ground products obtained by grinding the Palmae plant and then reducing an amount of Palmae plant parenchymous tissue in the Palmae plant by classification.

* * * * *